United States Patent
Williams et al.

[11] Patent Number: 5,925,329
[45] Date of Patent: Jul. 20, 1999

[54] ZEOLITES AND PROCESS FOR PREPARATION THEREOF

[76] Inventors: Craig D. Williams, 208 New Hampton Road West, Newbridge, Wolverhampton WV6 0RW, United Kingdom; Kay Latham, 15 Chequer Street, Penn Fields, Wolverhampton WV3 7DL, United Kingdom

[21] Appl. No.: 08/718,426

[22] PCT Filed: Mar. 24, 1995

[86] PCT No.: PCT/GB95/00679

§ 371 Date: Dec. 16, 1996

§ 102(e) Date: Dec. 16, 1996

[87] PCT Pub. No.: WO95/26317

PCT Pub. Date: Oct. 5, 1995

[30] Foreign Application Priority Data

Mar. 25, 1994 [GB] United Kingdom .................... 9405959
Jan. 23, 1995 [GB] United Kingdom .................... 9501265

[51] Int. Cl.⁶ ............................. C01B 39/06; C01B 39/32
[52] U.S. Cl. .................. 423/700; 423/713; 423/DIG. 28
[58] Field of Search ............................... 423/326, 327.1, 423/328.1, 700, 713

[56] References Cited

U.S. PATENT DOCUMENTS

| | | |
|---|---|---|
| 3,535,975 | 10/1970 | Ueda et al. . |
| 3,879,525 | 4/1975 | Miyata et al. .......................... 423/326 |
| 4,832,927 | 5/1989 | Higgins et al. . |
| 4,892,720 | 1/1990 | Skeels et al. . |
| 4,960,578 | 10/1990 | Vaughan et al. . |
| 5,000,932 | 3/1991 | Vaughan . |
| 5,096,686 | 3/1992 | Vaughan et al. . |
| 5,185,136 | 2/1993 | Vaughan et al. . |
| 5,208,006 | 5/1993 | Kuznicki et al. ........................ 423/713 |
| 5,244,650 | 9/1993 | Kuznicki et al. ........................ 423/718 |
| 5,302,362 | 4/1994 | Bedard .................................... 423/306 |
| 5,328,675 | 7/1994 | Vaughan et al. ..................... 423/328.2 |
| 5,338,525 | 8/1994 | Joly et al. ............................... 423/326 |
| 5,370,853 | 12/1994 | Schnick et al. .......................... 423/371 |
| 5,677,254 | 10/1997 | Nojima et al. ............................. 502/65 |
| 5,688,484 | 11/1997 | Saxton et al. ........................... 423/700 |
| 5,695,736 | 12/1997 | Saxton et al. ........................... 423/700 |

FOREIGN PATENT DOCUMENTS

| | | |
|---|---|---|
| 0 070 657 | 1/1983 | European Pat. Off. . |
| 0 405 978 | 1/1991 | European Pat. Off. . |
| 28 48 849 | 5/1980 | Germany . |
| WO85/04855 | 11/1985 | WIPO . |
| WO85/04856 | 11/1985 | WIPO . |

OTHER PUBLICATIONS

Grant et al., Grant & Hackh's Chemical Dictionary, pp. 376, 607 & 615, 1987.

*Primary Examiner*—Mark L. Bell
*Assistant Examiner*—David Sample
*Attorney, Agent, or Firm*—Dougherty & Associates

[57] ABSTRACT

The invention relates to zeolites which have high substitution levels of element with regard to aluminium content and in particular such zeolites where the substitute to silicon ratio is also high. A method for producing such zeolites by presenting the substitute material in tetrahedral oxo-anion form is also provided.

7 Claims, 11 Drawing Sheets

Amounts of reagents used in syntheses

|  | Sample (x) | | | | | | |
|---|---|---|---|---|---|---|---|
| Reagent | 0.0 | 0.25 | 0.50 | 0.75 | 0.825 | 0.9 | 1.00 |
| KOH | 25.44 | 23.94 | 22.44 | 20.96 | 20.52 | 20.08 | 19.50 |
| Al | 1.36 | 1.02 | 0.67 | 0.34 | 0.24 | 0.13 | 0.00 |
| $K_2FeO_4$ | 0.00 | 2.48 | 4.95 | 7.40 | 8.13 | 8.86 | 9.83 |
| $SiO_2$ | 30.26 | 30.16 | 30.04 | 29.94 | 29.90 | 29.87 | 29.83 |
| $H_2O$ | 142.94 | 142.40 | 141.90 | 141.36 | 141.21 | 141.06 | 140.84 |
| Total | 200 | 200 | 200 | 200 | 200 | 200 | 200 |

Values in columns are given in grams.

*Fig. 1*

Comparison of cell dimensions and unit-cell volume for LTL and iron-substituted samples

| Sample (x) | Hexagonal unit cell space group P6/MMM | | |
|---|---|---|---|
| | $a$ (Å) | $c$ (Å) | Unit-cell volume (Å$^3$) |
| 0.00 | 18.3705 | 7.5213 | 2198 |
| 0.25 | 18.4197 | 7.5418 | 2216 |
| 0.50 | 18.4865 | 7.5385 | 2231 |
| 0.75 | 18.5770 | 7.5724 | 2263 |
| 0.825 | 18.6321 | 7.5784 | 2278 |

*Fig. 3*

I.r. bands exhibited by pure LTL and iron-containing LTL in the region of 1200-400 cm-1

|  | Sample (x)* | | | | |
| --- | --- | --- | --- | --- | --- |
|  | 0.00 | 0.25 | 0.50 | 0.75 | 0.825 |
| Asymmetric stretch | 1146(sh) | 1146 | 1146 | 1146 | 1146 |
|  | 1099(s) | 1097 | 1092 | 1090 | 1082 |
|  | 1066(s) | 1070 |  |  |  |
|  | 1028(s) | 1024 | 1022 | 1018 | 1018 |
|  |  | 978(sh) | 978 | 978 | 978 |
| Symmetric stretch | 769(wk) | 771 | 769 | 766 | 764 |
|  | 727(wk) | 723 | 719 | 715 | 710 |
|  | 634(sh) | 631 | 627 |  |  |
| Double rings | 609(m) | 607 | 606 | 600(wk) | 598 |
|  |  |  | 596(wk) | 592 |  |
| T-O bond | 592(m) | 592 | 590 | 586 | 584 |
|  | 478(s) | 476 | 472 | 469 | 467 |
|  | 444(sh) | 442 | 440 | 438 | 436 |

*Values listed in columns are wavenumbers ($cm^{-1}$).

*Fig. 6*

Percentage weight loss with increasing temperature (40-800°C) for Al-LTL and Al(Fe)-LTL samples during thermogravimetric analysis

| Sample (x) | Peak range (°C) | Peak temp. (°C) | Weight loss (%) |
|---|---|---|---|
| 0.00 | 43-221 | 124 | 12.0 |
| 0.25 | 43-243 | 120 | 11.60 |
| 0.50 | 45-231 | 116 | 10.50 |
| 0.75 | 46-248 | 117 | 9.80 |
| 0.825 | 46-272 | 117 | 9.37 |

*Fig. 9*

Oxide composition of crystalline samples by semi-quantitative XRF analysis

| Sample (x) | Percentage composition (%) | | | | |
|---|---|---|---|---|---|
| | $SiO_2$ | $Al_2O_3$ | $Fe_2O_3$ | $K_2O$ | $H_2O$ |
| 0.00 | 53.3 | 16.5 | 0.00 | 17.3 | 12.0 |
| 0.25 | 53.9 | 14.0 | 2.61 | 17.1 | 11.60 |
| 0.50 | 52.5 | 12.2 | 8.69 | 15.4 | 10.50 |
| 0.75 | 49.5 | 8.18 | 15.30 | 16.8 | 9.80 |
| 0.825 | 49.2 | 4.40 | 18.70 | 17.5 | 9.37 |

*Fig. 10*

Comparison of starting gel and product $Fe_2O_3$ and $Al_2O_3$ mole fractions

| Sample (x) | Mole fraction $Fe_2O_3$ (product) | Mole fraction $Al_2O_3$ (product) |
| --- | --- | --- |
| 0.00 | 0.00 | 1.00 |
| 0.25 | 0.157 | 0.843 |
| 0.50 | 0.416 | 0.584 |
| 0.75 | 0.652 | 0.348 |
| 0.825 | 0.81 | 0.19 |

*Fig. 11*

ZEOLITES AND PROCESS FOR PREPARATION THEREOF

This invention relates to zeolites and to a method of producing zeolites having increased amounts of metals instead of aluminium in zeolites.

Zeolites are hydrated aluminosilicate minerals which occur naturally, but which have increasingly been made synthetically. Zeolites have a three dimensional structure arising from a framework of basic units of $SiO_4^{-4}$ and $AlO_4^{5-}$ tetrahedra connected through their corners of shared oxygen atoms to form polyhedra. These basic units combine to form open frameworks containing channels and cavities in which cations and water molecules are located.

Cations are held within the structure due to the slightly negative overall charge of the tetrahedra.

Much investigative work was originally carried out with synthetic zeolites to study the effect of variations in the silica/aluminium ratio. Ratios of 1600:1, i.e. silicalite and 1:1, i.e. zeolite A resulting. Subsequently, work extended into studying the substitution of atoms into the tetrahedra of the building blocks either in replacement of silica or aluminium. In particular, with regard to aluminium, it is known to replace the aluminium atoms to limited extents with titanium, iron, cobalt and other metallic atoms. Replacement of silicon to limited extents with germanium, phosphorous and other elements is also known. Such substitutions or variations are known to dramatically affect the zeolites performance both in relation to catalytic activity and/or other properties.

Zeolites are normally prepared from a silica source (such as sodium metasilicate or fume silica), a source of aluminium (for instance aluminium wire or an aluminium salt) and counter cations (usually an alkali metal hydroxide such as potassium hydroxide), together with water.

There are two basic methods by which attempts have been made to replace aluminium atoms within the structure or to produce Zeolites supplemented with other metal atoms. The first technique involves producing the aluminium/silicon zeolite in the normal manner and then stripping aluminium atoms from the structure of the crystal by chemical means; practically simultaneously metal atoms from solution are substituted in to the structure. This technique allows for only limited substitution of the aluminium, where a significant amount of aluminium is present within the structure. Attempts to substitute greater than 30% of the aluminium have resulted in the crystalline structure of the zeolite collapsing before the substitute metal atoms can be incorporated within the tetrahedra. This is particularly true of types such as zeolite L.

The second technique involves the preparation of a reaction mixture containing aluminium, silica, water and caustic soda together with a salt of a transitional metal which competes with the aluminium during the zeolite's formation. This results in the substitute metal's incorporation within the crystalline structure to a limited extent. Chlorates and nitrates of the transition metal are commonly used as the source forms. This technique also has an upper limit of 30% or so of the aluminium being replaced as is shown for instance in PCT Application WO 92/13799. Above this figure very poor crystallisation and/or poor stability of the product occurs, with the result that practically amorphous product results.

Thus whilst high level substitution has previously been claimed the present invention aims to provide a method for and materials which actually have such high levels of substitution.

It is strongly desirable to produce zeolites containing greater than 30% or so of aluminium substitutes, such as Fe, Mn, V as these zeolites potentially offer improved or even substantially new catalytic ion-exchange and/or other properties. It is the manufacture of such high content substitute metal zeolites which is the problem addressed.

According to the first aspect of the invention, we provide a zeolite in which the Si:Me ratio is 4:1 or less (for example 3:1), where Me is any metallic element other than aluminium and Me is introduced to the zeolite in tetrahedral oxo-anion form.

Preferably a Si:Me ratio of 4.25:1 or less (ie. 3:1, 2:1, etc) is ensured. And most preferably 4:1 or less.

Preferably the aluminium to other metal ratio is between 2:1 or less, Al to other metal or metals (Al:Me).

The Al:Me ratio may be between 2:1 and 1:20.

Preferably the ratio is between 3:2 and 1:20. Most preferably between 1:1 and 1:20. Ratios of 1:1 and 1:10 or 1:8 are envisaged.

The substitute metal may be iron, manganese, vanadium, or other metals, in particular transitional metals. Combinations of two or more such metals are also envisaged.

Preferably Si:Al is between 1:1 and 1000:1; 500:1 or; 250:1. In addition it is also preferred that the Si:Me ratio be between 4.25:1 and 1.5:1, most preferably 4:1 and 2.5:1.

The Zeolites produced may be of the composition XSi: YAl: ZMe, where X is 2 to 2000, Y is 1 or 2 and Z is 1 to 20 and Y+Z≦X. Preferably Z≧¼ X.

Preferably X≦1000Y and most preferably X≦550Y and may be X≦250Y, 100Y, 50Y, 25Y or 10Y.

Preferably Z≧Y and most preferably Z≧2Y.

According to a second aspect, we provide a zeolite made in accordance with the method or process of the third or fourth aspects of the invention.

According to a third aspect of the invention, we provide a method for producing a zeolite, the method comprising providing a source of silica, a source of aluminium, and a source of water, together with a source of one or more other metallic species, at least one of said other species comprising a tetrahedral oxo-anion.

We have appreciated that using species of metal ions which have co-ordinations other than tetrahedral (as has previously invariably been done) is prejudicial to having a high level of non-aluminium metal in the Zeolite. This is particularly so where the metal is coordinated with non-oxygen atoms as the metal must first lose these atoms then bind with oxygen atoms to give the preferred unit for substitution.

The species may be $FeO_4^{2-}$ or $MnO_4^-$ and, in particular may be introduced as $K_2FeO_4$ or $KMnO_4$.

Preferably said species has stable tetrahedral coordination for a sufficient period of time under alkali conditions for said zeolite to be produced incorporating said species. It is believed that a relatively unstable species can be used provided it maintains tetrahedral coordination for a time sufficient for incorporation. In this regard time periods in excess of two hours are useful, but periods between four and five hours are adequate. Once incorporated the surrounding crystaline framework maintains the stability of the species. The species is also preferably soluble under alkali conditions.

The species is preferably provided in the regent in combination with an ionic species which preferentially causes crystallisation of the respective zeolite.

The species may act by providing nucleation sites for zeolite crystallisation.

Preferably said species is taken into said zeolite in preference to aluminium.

According to a fourth aspect of the invention we provide a process for producing zeolites comprising providing a source of aluminium, silicon, water and one or more further metallic elements, in elemental or compound form, wherein one or more of the further elements comprises a metallic element (other than aluminium) provided in tetrahedral oxo-anion configuration.

According to a fifth aspect, we provide a process for producing zeolites containing silicon, aluminium and one or more other metals, said metals being present in a ratio of greater than 1:2 with respect to the aluminium content, the process comprising providing one or more of said other metals for producing said zeolite in the reaction mixture in tetrahedral oxo-anion configuration.

Preferably said metal or metals in total exceed said amount of aluminium contained within said zeolite crystal.

Said metal may be present in a range of ratios between 2:1 Al/Me to 1:20 Al/Me.

The Si/Al ratio may be between 1000/1 and 1/1; preferably 500/1 and 2/1; most preferably 250/1 and 5:1.

Most preferably the Si:Al and Al:Me ratios are such that the Si:Me ratio is 4:1 or more (ie. 3:1, 2:1 etc).

Preferably Me is any one or more of Iron, Vanadium, or Manganese. With regard to Iron the metal is preferably presented as a ferrate and most preferably as potassium ferrate.

As a result of our research we believe that the limiting factor in substitution for aluminium is the requirement of the substitute component to assume tetrahedral structure to produce the zeolite as against the octrahedral co-ordination of previous sources used as the substitute material. In this regard we believe that the incompatibility in co-ordination of the source of Me means that the Me ions resist the tendency to be taken into and form the tetrahedral structure of zeolites. By providing tetrahedral coordinated species this resistance is reduced.

In producing the zeolites of the current invention we selected stable species of the desired metallic substitute or substitutes, in which the substitute atom had tetrahedral co-ordination. For many such species a high to very high pH may be required to achieve a sufficient period of stability. Of course not all species may require this and the required pH is likely to vary from species to species.

According to a further aspect of the invention we provide a zeolite in which the aluminium to other metal ratio is 2:1 or less, Al to metal or metals (Al:Me), provided that the zeolite does not have a silicon to non-aluminium metal ratio of 4:1 or more (ie. 4.5:1).

This invention provides zeolites which were not previously possible in terms of the level of non-aluminium metals present.

It is preferred that the zeolite does not have a Si:Me ratio of 3.8:1 or 3.7:1 or 3.6:1 or 3.5:1 or 3.4:1 or even less, such zeolites being in excess of those previously thought possible.

According to another aspect of the invention we provide a method for producing a zeolite, the method comprising providing a source of silica, a source of aluminium, and a source of water, together with a source of one or more other metallic species, at least one of said other species having tetrahedral coordination, provided that said at least one of said other species is not a tetrahedral non oxo-anion form.

With regard to substitution of iron into the structure potassium ferrate was selected. For substitution to occur the reagents selected should normally be stable for at least 4 to 5 hours to allow the zeolite producing reaction to occur sufficiently to give rise to crystallisation. Potassium ferrate usually requires a pH in excess of 11 to give such duration of stability. At pH 13 the compound can be expected to remain stable for several days.

During tests carried out on zeolite L, chosen because of its potassium preference for crystallisation, a variety of amounts of potassium ferrate were used in substitution for aluminium wire. Other forms of Ferrate may be selected to produce other Zeolites. The resulting zeolites displayed highly crystalline. and stable structures, but incorporated 75% and even up to 81% substitution of Fe atoms for aluminium atoms, (1:3; Al:Fe). We believe that no-one has achieved comparable levels of substitution.

In similar tests, for example on zeolite L, zeolites incorporating over 50% Manganese were produced, well in excess of the previous limit of 25% substitution. Potassium manganate, $KMnO_4$, prepared according to the method given in "Practical Inorganic Chemistry" Pass and Sutcliffe, Pub. Chapman and Hall was used. Such substitution techniques are believed to be particularly suitable for zeolites which use a cation as a template.

The resulting zeolites were analysed by a variety of ways to determine their structure and composition. X-ray diffraction showed that the unit cell size of the zeolite increased almost linearly with the increase in iron present in the solution, supporting the fact that the iron was taken up into the zeolite.

Fourier transformation infra-red studies confirmed that the expected Fe bonds, in tetrahedral form were present within the zeolites produced. Thus previously unobtainable levels of substitution and extents of iron incorporation have been obtained and demonstrated.

The size, shape and general morphology of a zeolite are known to affect catalytic performance, as is a change in the electronegativity of a zeolite. Substitution of Iron into a zeolite is expected to reduce its electronegativity based on theoretical prediction and given results from lower levels of substitution, as well as significantly altering its morphology. Such zeolites can be made according to this invention.

Specific further examples, test results and conclusions follow and relate to the inventive concept previously described.

BRIEF DESCRIPTION OF THE DRAWINGS

FIG. 1 is a table detailing reagent amounts for experiments to replace aluminum in crystalline zeolite LTL by $Fe^{3+}$;

FIG. 3 is a table detailing the comparison of cell dimensions and unit cell volume for LTL and iron substituted samples;

FIG. 6 is a table of I.R. bands exhibited by pure LTL and iron containing LTL in the region of 1200 to 400 $cm^{1-}$;

FIG. 9 is a table detailing percentage weight loss with increasing temperature for Al-LTL and Al(Fe)-LTL samples during thermogravimetric analysis;

FIG. 10 is a table of oxide compositions of crystalline samples obtained by semi-quantitative XRF analysis; and FIG. 11 is a table showing the comparison of starting gel and product $Fe_2O_3$ and $Al_{23}$ mole fractions.

Figure 2:
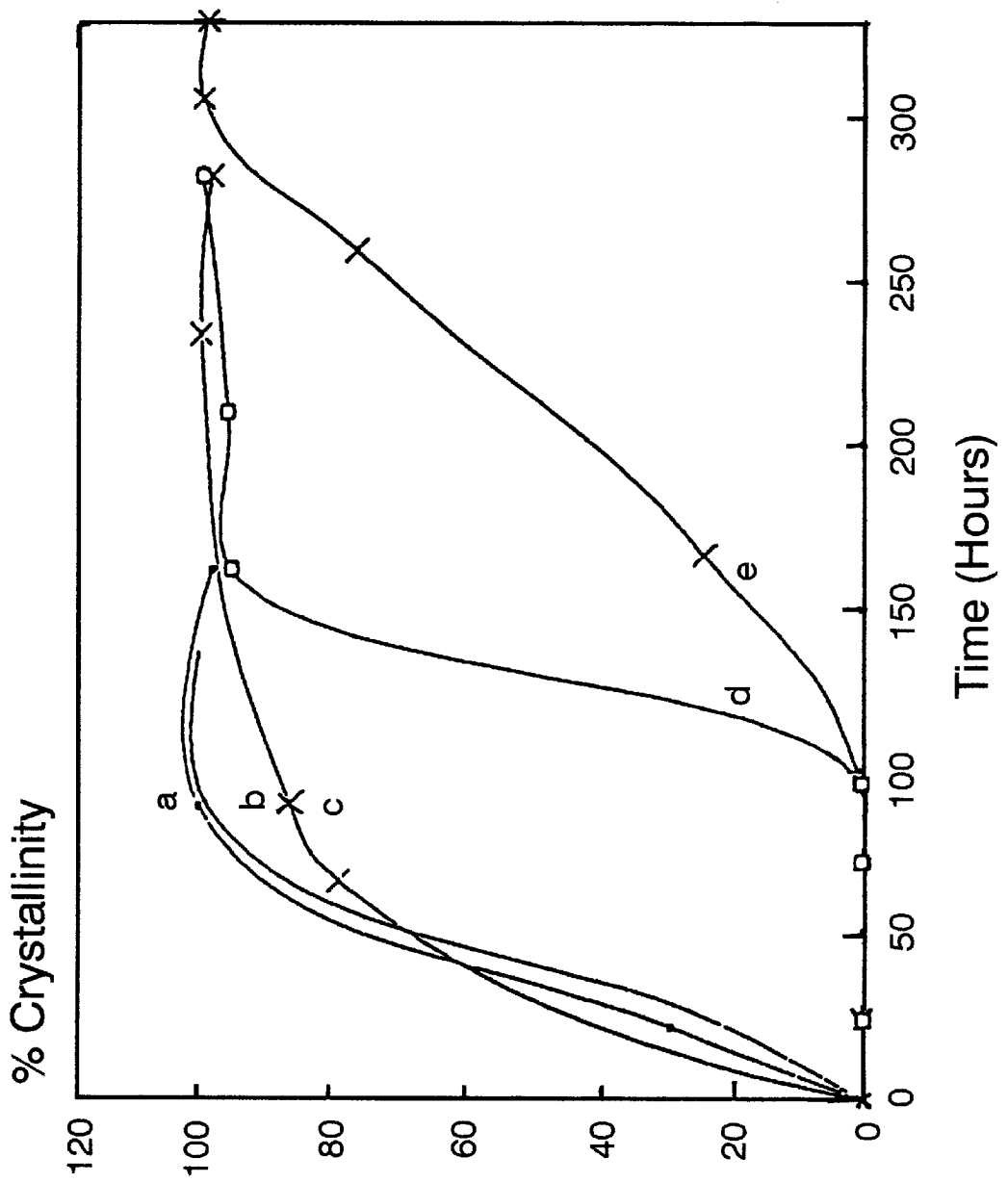
FIG. 2 is a graph illustrating crystallization curves for Al-LTL and Al(Fe)-LTL samples plotted against time.

Potassium ferrate, as a primary source of iron, has been investigated and proven in this invention in the hydrothermal synthesis of zeolite LTL. In this example crystalline material with Fe(111) incorporated into lattice sites was isolated from starting gels containing up to 0.825 mole fraction $Fe_2O_3/Al_2O_3$. The use of basic, tetrahedral iron species has extended previous maximum substitution levels. X-ray diffraction, infrared spectroscopy, chemical analysis, and electron microscopy provide evidence for the presence of framework iron. The development of new, i.r. absorption bands in the asymmetric and symmetric Si-O-T stretching region, and the shift to lower wavenumbers is accompanied by an increase in the interplanar spacings and unit-cell dimensions with increased $Al^{3+}$ replacement. A change in morphology is also observed.

The isomorphous replacement of Al or Si in the zeolite framework by heteroatoms produces new materials with significantly modified physicochemical and catalytic properties.[Chu, C. T., and Chang, C. D. J. Phys. Chem. 1985, 89, 1569; Dwyer, J., and O'Malley, P. J., Stud. Surf. Sci. Catal. 1987, 35, 219; Borade, R. B. Zeolites 1987, 7, 398]. These materials have the potential to carry out petrochemical and/or organic reactions. [John, C. S., Clark, D. M., and Maxwell, I. E. in Perspective in Catalysis (Eds. J. M. Thomas and K. I. Zamaroev) 1UPAC, 1991, 387; Holdericj, W. F., Hesse, M., and Maumann, F. Agnew. Chem. Int. Ed. Engl. 1988, 27, 226]. The use of iron (111) as a substituting element has been reviewed recently. [Ratnasamy, P., and Kumar, R. Catal. Today 1991, 9(4), 329]. The $Fe^{3+}$ ion has a larger ionic radius (0.63A) than $Al^{3+}$ (0.53A), and its tendency to form insoluble hydroxides in a basic environment and ability to change oxidation state has presented many synthetic problems. Despite this, ferrisilicate analogues of many zeolites, e.g., ZSM-5, Y, beta, and mordenite, have been prepared and characterised successfully but with only low levels of substitution and low total amounts of Fe present in the zeolite structure.

In this example the synthesis of crystalline LTL zeolite in which up to 0.825 mole fraction $Al_2 O_3$ has been replaced by $Fe_2O_3$ in the framework is demonstrated. This has been achieved using potassium ferrate ($K_2FeO_4$). The use of ferrate(VI) in impregnation, i.e., secondary synthesis and surface treatment has been widely documented, but it seems that $FeO_4^{2-}$ as a source of framework iron is relatively unexplored. [Barrer, R. M., and Cole, J. F. U.S. Pat. No. 3,674,709, Air Products (1972)]. The $FeO_4^{2-}$ ion, which is moderately stable in strongly alkaline media and has tetrahedral geometry (isostructural to Al $(OH)_4$ _), has been found by us to encourage the nucleation of zeolite species. A maximum level of substitution of 0.3 mole fraction in LTL has been reported previously. [Joshi, P. N., Awate, S. V., and Shiralkar, V. P. J. Phys. Chem. 1993, 97(38), 9749].

Potassium ferrate ($K_2FeO_4$) was prepared using the method outlined by Audette and Quail. [Aidette, R. J., and Quail, J. W. Inorg. Chem 1972, 11(8), 1904]. Fine aluminium powder (GPR supplied by BDH chemicals), fumed silica (98% CAB-O-SIl M5 BDH Scintran), and potassium hydroxide pellets (GPR-Scientific and Chemical Supplies Ltd., Bilston, West Midlands) were used as supplied together with deionised water.

The starting molar composition was:

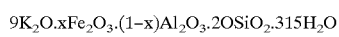

where x=0, 0.25, 0.5, 0.75, 0.90 and 1. The reagents amounts for each experiment are given in the table below.

| X | 0.0 | 0.25 | 0.5 | 0.75 | 0.90 | 1 |
|---|---|---|---|---|---|---|
| KOH | 25.44 | 23.94 | 22.44 | 20.96 | 20.08 | 19.50 |
| Al | 1.36 | 1.02 | 0.67 | 0.34 | 0.13 | 0.0 |
| $K_2FeO_4$ | 0.0 | 2.48 | 4.95 | 7.40 | 8.86 | 9.83 |
| $SiO_2$ | 30.26 | 30.16 | 30.04 | 29.94 | 29.87 | 29.83 |
| $H_2O$ | 142.94 | 142.40 | 141.90 | 141.36 | 141.06 | 140.84 |
| Total | 200 | 200 | 200 | 200 | 200 | 200 |

The reaction mixture was prepared by dissolving potassium hydroxide in ~35 $cm^3$ of deionized water and carefully adding any aluminium powder in small aliquots. The solution was then allowed to cool for 20 min before addition of any sold $K_2FeO_4$ while stirring. The purple solution was then added slowly to silica slurried in ~105$cm^3$ of water and mixed thoroughly by hand to a smooth, purple paste. A slight increase in temperature and thickening of the reaction mixture was observed. The pH taken at this time was between 13.5 and 14.0. The gel was sealed in PTFE bottles (75 $cm^3$) and heated statically at 100±1° C. No intentional seeding or aging was carried out. Samples were removed and cooled periodically, 24 hour intervals in most cases, 48 hours for 0.75 and 0.9 tests and solid products were separated from the mother liquor by Buchner filtration. The samples were then washed with deionized water (3×30$cm^3$) and heated overnight at 40±1° C. in a drying oven.

Solid products were characterised using conventional techniques. The crystallinity of materials was determined from XRD patterns recorded on a Philips 1710 X-ray diffractometer using $CuK\alpha$ radiation. The samples were compared by computerised on-line isotypical search with the JCPDS standard 39-224 ($K_6Na_3Al_9Si_{27}O_{72}21H_2O$). The size, shape, and morphology of the zeolite crystals were examined using a scanning electron microscope (Philips 515) after coating with gold-evaporated film on an aluminium peg. The framework i.r. spectra reported are for hydrated zeolites supported in alkali halide wafers. The samples (0.5 mg) were uniformly mixed with 200 mg of dry KBr (BHD SpectrosoL) and ground by hand in a pestle and mortar for 5 min. The mixture was then pressed at 9 tons to give a transparent fused halide window (13 mm diameter). Spectra were recorded in air at room temperature on a Philips PU9624 FTi.r. spectrophotometer. Thermogravimetric analysis was performed on a Mettler TG50 thermobalance/Mettler TA3000 processor under nitrogen at a heating rate of 20 K min $^{-1}$ using ~15 mg of sample. Chemical composition was determined on an ARL 8410 X-ray spectrometer using the ARL semiquantitative analysis package. The samples (0.3 g) were accurately weighed and sandwiched between X-ray transparent film (Mylar). Results were calculated as oxides from the stoichiometry.

The replacement of aluminium in crystalline zeolite LTL by $Fe^{3+}$ was attempted systematically. The starting molar composition was:

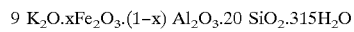

where x=0,0.25, 0.50, 0.75, 0.825, 0.90, and 1.0.

The reagent amounts for each experiment are given in FIG. 1.

Fully crystalline LTL zeolites were obtained in this example from systems containing up to x=0.825 $Fe_2O_3$. These materials were white/cream in colour and showed good pattern matching to standard 39-224 by X-ray diffraction. The products from systems containing 0.90 and 1.00 mole fraction were amorphous, brown solids. Joshi et al. [Joshi, P. N., Awate, S. V. and shiralkar, V. P. J. Phys. Chem. 1993,98(38), 9749] reported a maximum level of substitution of x=0.3 using iron (111) nitrate [Fe(NO$_3$)$_3$.9H$_2$O] as a source of iron. They claimed that above this level the larger Fe—O bond length compared with Al—O inhibited the formation of the cancrinite cage (submit of LTL). Our results suggest that much greater substitution is possible, provided that the iron is available in the starting gel in a suitable form.

Figure 4:
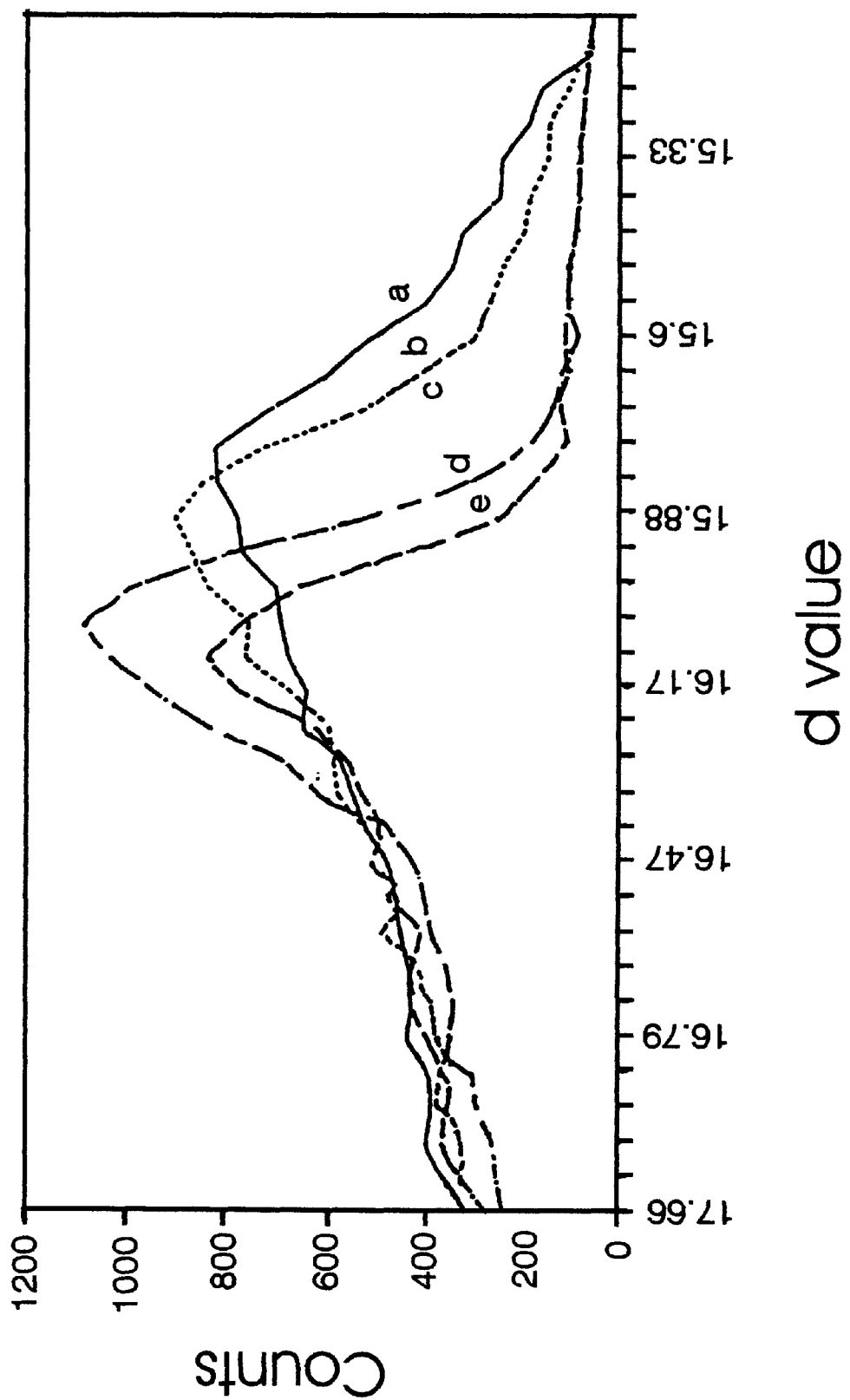
FIG. 4 is a graph showing the increase in interplanar spacing for hkl(100) with increased replacement of $Al^{3+}$.

The kinetics of crystallization were followed by XRD measurements on the washed, dry solids. The percentage crystallinity was calculated by the ratio of the sum of the most intense reflectances of the sample to that of the most crystalline reference. In general, the rate of crystallization decreased with increasing iron concentration in the gel, behavior recognized by Joshi (FIG. 2). We confirm that both the induction period (nucleation) and the time taken to reach maximum crystallinity were extended at higher levels. it was noted that all the XRD reflections for iron-substituted samples were shifted to higher d values compared with AL-LTL. The positions hk(100), the most prominent peak, for each crystalline zeolite are shown in FIG. 4. This shift was accompanied by an overall increase in the unit-cell parameters, cell dimensions and volume, with increased Al$^{3+}$ replacement (FIG. 3). This progressive increase is significant evidence for framework incorporation of iron.

Figure 5:
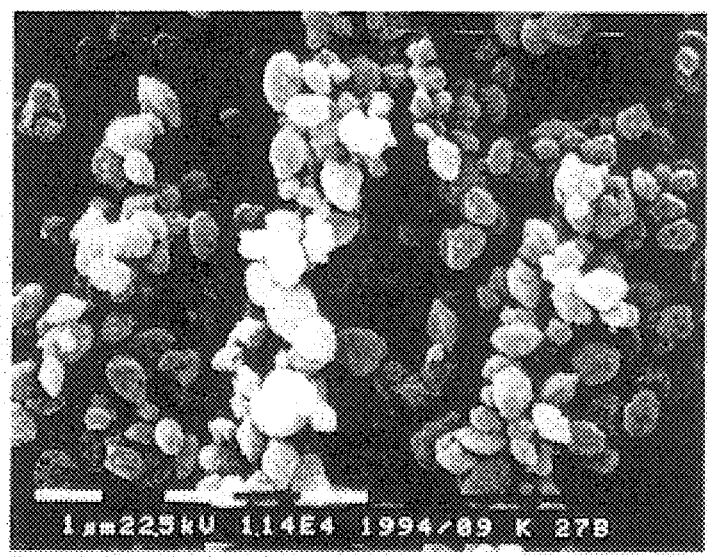
FIGS. 5(a)–5(c) show SEM micrographs of Al-LTL and iron substituted samples.
Figure 5:
Figure 5:
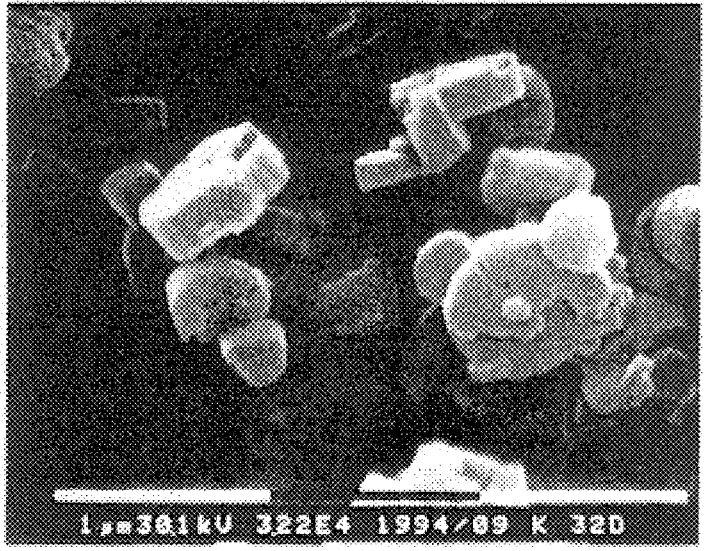

SEM micrographs of the Al-LTL and the iron-containing samples indicate good quality crystals of even distribution and no amorphous material. The crystals were generally very small in size (~1 μm or less). A distinct change in morphology is also observed on increasing the iron content (FIG. 5).

The crystals can be described as "platelet" shaped, cylindrical with a length/diameter ratio of ~0.5. The Al-LTL samples have a domed basal plane with a series of steps or terraces. The iron-substituted crystals have basal planes of increasing flatness and become more "ice-hockeypuck" shaped with increased aluminium replacement (FIG. 5a–c).

This morphological effect has been recognized by Verduijn [Verduijn, J. P. Int. pat. W092/13799, Exxon Chemicals (1992)] for aluminosilicate K-LTL from a synthesis gel containing up to 0.06 Fe$_2$O$_3$/Al$_2$O$_3$. A general decrease in crystal size on increased iron substitution was also recorded. Zeolite LTL is used as a catalyst in the reforming of hydrocarbons, especially the aromatization of paraffins. Verduijn demonstrated that a Pt-loaded, iron-containing LTL catalyst with ice-hockeypuck morphology showed significantly improved selectivity and stability over standard, commercial zeolite K-(Al)LTL. Hammer [Hammer, International Journal of Energy Research, Vol.18, 223–231(1994)] have demonstrated the significance of Fe load and the likelyhood of increase activity, both catalytic and ion-exchange, if such levels could be achieved. Therefore, the presence of framework iron in the zeolite and the flatness of basal planes are an indication of the intrinsic catalytic quality of the crystals.

Figure 7:
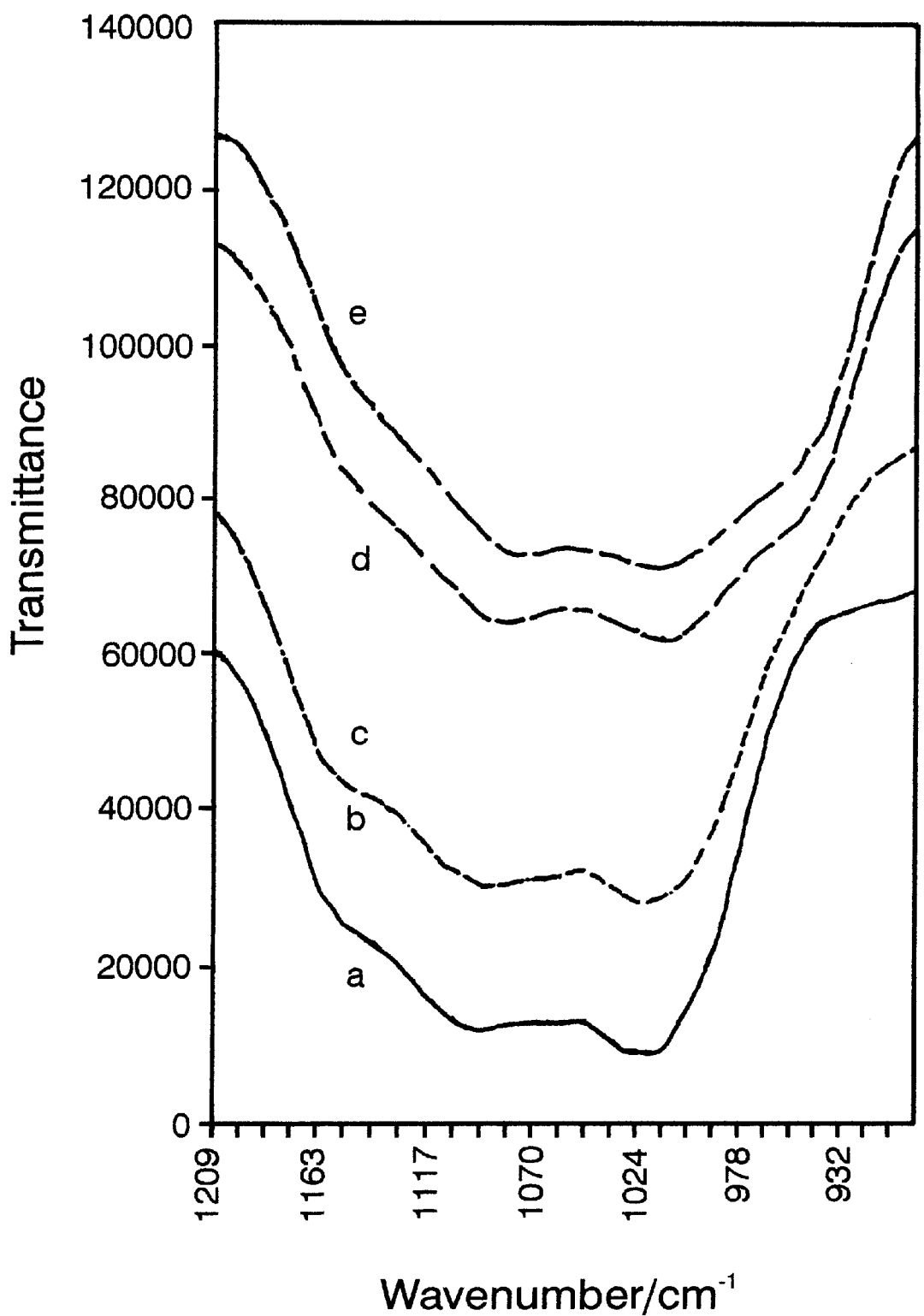
FIG. 7 is a graph of the infrared asymmetric Si-O-T stretching region showing peak shift to lower wave number and development of shoulder at approximately 975 $cm^{-1}$ on increased $Fe^{3+}$ framework substitution.

The i.r. spectra of zeolite LTL and its iron-containing analogues closely agree with the literature [Flanigen, E. M., Khatami, H., and Szymanski, H. A. Molecular Sieve Zeolites, Adv. Chem. Ser., American Chemical Society, Washington, D.C., 1971, 101,201–229]. The characteristic absorption bands are assigned in FIG. 6. It can be seen that the Si-O-T asymmetric and symmetric stretching vibrations and the T-O bend shift progressively to lower wavenumbers on increasing iron content in the gel. Further evidence for framework siting of Fe atoms is suggested by the observation of a band (shoulder) at around 978 cm$^{-1}$, which is absent in the i.r. spectrum of pure Al-LTL. The relative intensity of the sholder at 978 cm$^{-1}$, increases with increasing iron content, as shown in FIG. 7.

Figure 8:
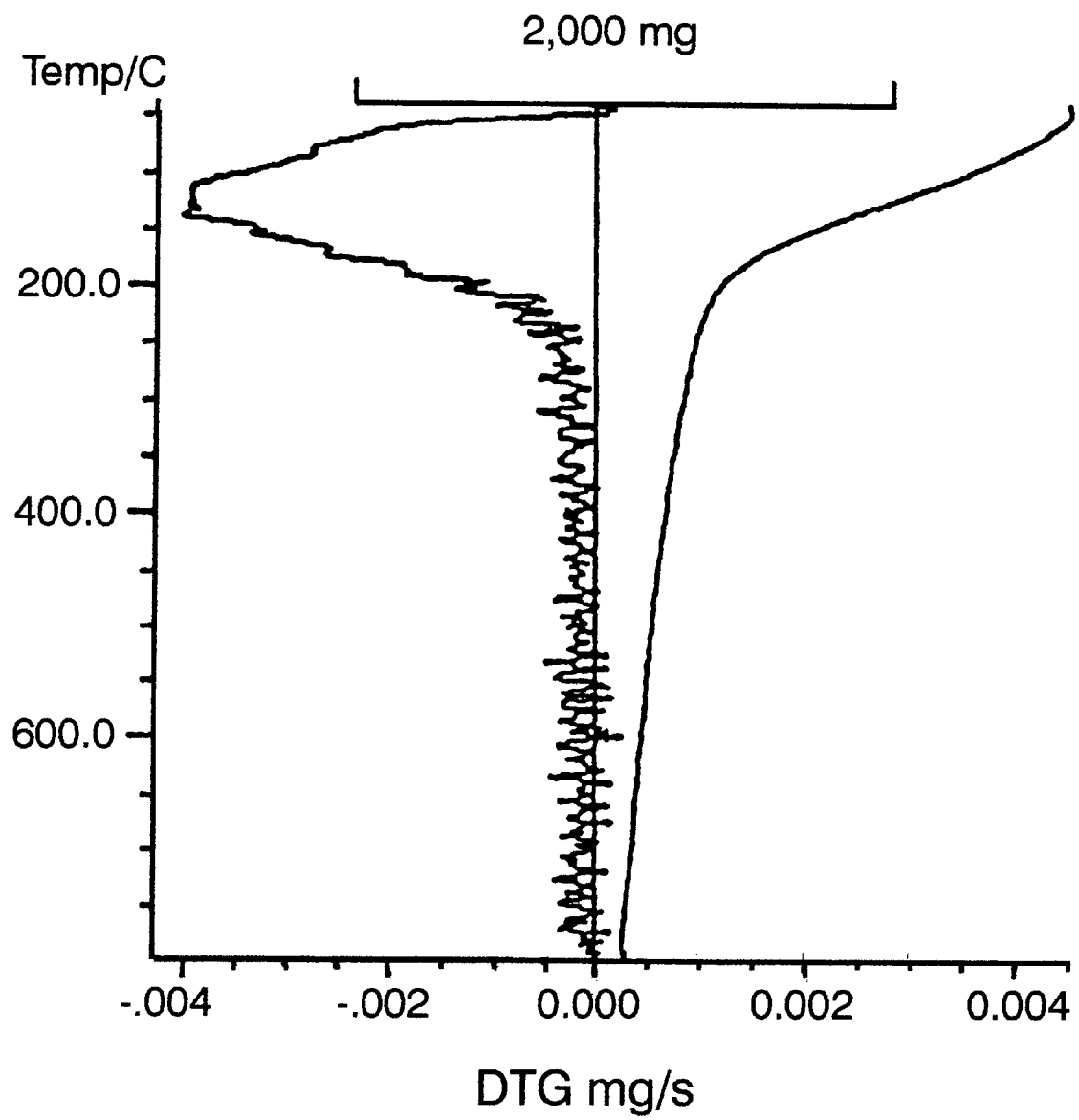
FIG. 8 shows a typical t.g.a./d.t.g.a. trace for LTL zeolite.

A typical t.g.a./d.t.g.a. trace is shown in FIG. 8.

The sharp, endothermic weight loss at ~120° C. is characteristic of LTL-type zeolites. This peak corresponds to the desorption/dehydration of physically absorbed water molecules. The peak temperature and the percentage weight loss decrease slightly on increased iron substitution (FIG. 9). This suggests that samples containing iron are more hydrophobic and that the occluded water is less strongly bound. The reduced water content is not unexpected. Due to the larger size of the Fe(111) ion, a greater charge delocalization may be possible. This would lead to lower polarizing power at the iron sites over those containing aluminium.

Bulk chemical analysis of crystalline material was carried out using X-ray spectroscopy. Elemental composition expressed as oxides, and mole fractions of Fe$_2$O$_3$ and Al$_2$O$_3$ for the starting gel and products are given in FIGS. 10 and 11. A steady increase in the Fe$_2$O$_3$/Al$_2$O$_3$ ratio on increased Fe content of the reaction gel can be seen. This indicates preferential up-take of iron, over aluminium, into the structure. There is also a corresponding decrease in percentage SiO$_2$. In all cases the K$_2$O/(Al$_2$O$_3$+Fe$_2$O$_3$) ratios were slightly higher than expected. This may be due to insufficient washing at the isolation stage.

Iron (111) framework-substituted LTL zeolite has been prepared with up to 0.825 mole fraction Al$_2$O$_3$ replaced by Fe$_2$O$_3$. The use of basic, tetrahedral FeO$_4^{2-}$ ions as a source of Fe$^{3+}$ has extended previous substitution levels. The nucleation of zeolite species and the formation of the cancrinite cage is therefore possible at values of x>0.3. All crystalline products were white/cream in colour, indicating the absence of occluded oxides, and the mother liquors were colourless.

Evidence for lattice incorporation was obtained from XRD. All samples, Al-LTL and Al(Fe)-LTL, showed excellent pattern matching to standard 39-224. Increased Al$^{3+}$ replacement resulted in a notable peak shift to increased d spacings, and larger unit cell parameters (dimensions and volume) were observed, reflecting the larger size of the Fe$^{3+}$ ion. The i.r. stretching vibrations of the Si-O-T move progressively to lower wavenumbers on increased iron(111) incorporation. The development of a new band at ~975cm$^{-1}$ that is absent from the i.r. spectrum of pure LTL and becomes more intense at higher iron concentrations is also a good indicator of lattice substitution.

Chemical analysis of the samples showed increased Fe$_2$O$_3$/Al$_2$O$_3$ content, and the ice-hockeypuck morphology associated with iron-containing K-LTL zeolite was evident from electronmicroscopy.

We claim:

1. A process for producing a zeolite comprising the steps of:

(a) providing a source of aluminum (Al) dissolved in a metal hydroxide solution;

(b) introducing a source of at least one metallic element (Me) other than aluminum in tetrahedral oxo-anion form to the metal hydroxide solution;

(c) mixing the metal hydroxide solution with a source of silicon (Si) slurried in water; and (d) subjecting the mixture to conditions suitable to cause a reaction which forms a zeolite;

wherein said Me source is selected from the group consisting of FeO$_4^{2-}$ and MnO$_4^{-}$.

2. A process according to claim 1 wherein the step of introducing said Me further comprises introducing said Me in combination with an ionic species having nucleation sites for causing crystallization of the resulting zeolite.

3. A process according to claim 1 wherein the ratio of said Si to said Al (Si:Al) is less than about 1,000 to 1 (1,000:1) and greater than about 1 to 1 (1:1).

4. A process for producing a zeolite comprising the steps of:
   (a) providing a source of aluminum (Al) dissolved in a metal hydroxide solution;
   (b) introducing a source of at least one metallic element (Me) other than aluminum in tetrahedral oxo-anion form to the metal hydroxide solution;
   (c) mixing the metal hydroxide solution with a source of silicon (Si) slurried in water; and
   (d) subjecting the mixture to conditions suitable to cause a reaction which forms a zeolite;
   wherein the ratio of said Me to said Al (Me:Al) is greater than about one to two (1:2); and
   wherein said Me source is selected from the group consisting of $FeO_4^{2-}$ and $MnO_4^-$.

5. A process according to claim 4 wherein the step of introducing said Me further comprises introducing said Me in combination with an ionic species having nucleation sites for causing crystallization of the resulting zeolite.

6. A process according to claim 4 wherein the ratio of said Si to said Al (Si:Al) is less than about 1,000 to 1 (1,000:1) and greater than about 1 to 1 (1:1).

7. A process according a zeolite comprising the steps of:
   (a) dissolving potassium hidroxide in deionized water;
   (b) introducing aluminum powder to the potassium hidroxide solution;
   (c) cooling the potassium hidroxide solution;
   (d) introducing solid potassium ferrate to the cooled potassium hidroxide solution;
   (e) mixing the potassium hydroxide solution containing the dissolved aluminum powder and the dissolved potassium ferrate with a slurry of silica and water;
   (f) heating the mixture statically at about 100° C.;
   (g) cooling the mixture;
   (h) filtering the solid product from the mixture;
   (i) washing the filtered solid product in deionized water; and
   (j) driving the filtered and washed solid product for at least 12 hours at about 40° C.

* * * * *